March 26, 1957     J. N. SIMPSON     2,786,204

ADJUSTABLE SUSPENSION FOR HELMETS

Filed June 28, 1954

INVENTOR.
J. N. SIMPSON
BY
*William J. Ruano*
ATTORNEY

United States Patent Office 2,786,204
Patented Mar. 26, 1957

2,786,204

ADJUSTABLE SUSPENSION FOR HELMETS

Jack N. Simpson, Reading, Pa., assignor, by mesne assignments, to Ray-O-Vac Company, Madison, Wis., a corporation of Wisconsin Application June 28, 1954, Serial No. 439,657

1 Claim. (Cl. 2—9)

My invention relates to an adjustable suspension for helmets and other face protective shields, and more particularly relates to a headband suspension permitting adjustability of the angle of tilt of the shield and permitting adjustability of the headband with respect to a crown strap.

It is known in the art to provide a headband suspension adjustably connected to a face protecting shield to allow angular tilting and adjustment for holding of the shield above the face when not needed, also to provide adjustment of the headband straps. Such devices, however, have had the outstanding and common disadvantage of being of relatively complicated design, involving many mechanical parts which add considerably to the cost of manufacture of the assembly. Moreover such devices have not been entirely reliable and satisfactory in operation, particularly in the matter of adjustment. Additionally, because of the many special parts involved in conventional devices they have not been readily replaceable or repairable by the user.

An object of the present invention is to provide a novel headband suspension for helmets and other types of face protective shields, which suspension overcomes the above named disadvantages of conventional suspensions and involves a minimum number of simple parts which greatly facilitate adjustment and considerably reduce the overall cost of the suspension.

A more specific object of my invention is to provide a simple friction type joint between the headband suspension and face protective shield, involving simply tightening of a screw for varying the amount of friction.

Another object of my invention is to provide a headband suspension involving a simple adjustment between the crown strap and brow band and involving a very simple type of chin rest or stop to provide an accurate and comfortable fit for different wearers.

Other objects and advantages will become apparent from a study of the following description taken with the accompanying drawing wherein.

Figure 1:
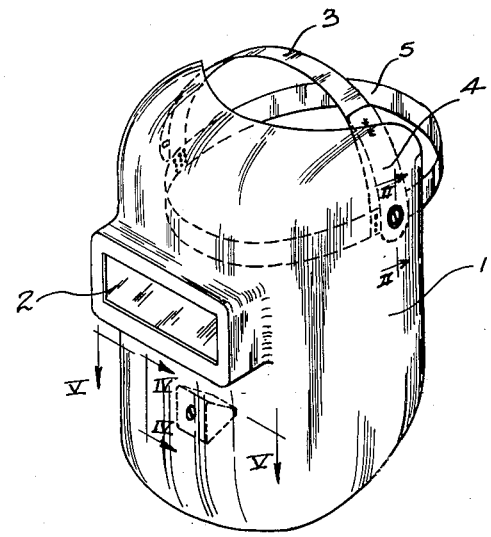
Figure 1 is a perspective view of a welding helmet involving an adjustable suspension embodying the principles of my invention.

Referring more particularly to the drawing, numeral 1 denotes a welding helmet of molded plastic or other suitable material and having a viewing window 2. However, instead of a welding helmet, a face protecting shield of any other type may be equally well adapted to the suspension embodying the present invention. The helmet or face protecting shield 1 is suspended by a headband suspension involving a crown strap 3 having ears 4 riveted or otherwise secured thereto and having a brow band 5 adjustably attached to the crown strap 3. The parts forming the headband assembly are preferably made of a rigid plastic material, for example, that sold under the trademark "Kralastic."

Figure 2:
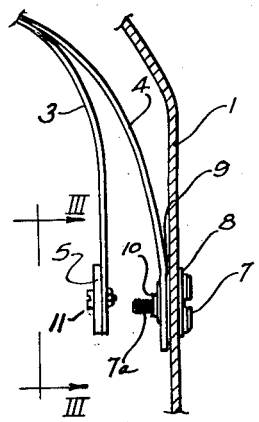
Figure 2 is an enlarged fragmentary sectional view taken along line II—II of Figure 1 showing the adjustable friction joint and other parts of the headband suspension of Figure 1.
Figure 6:
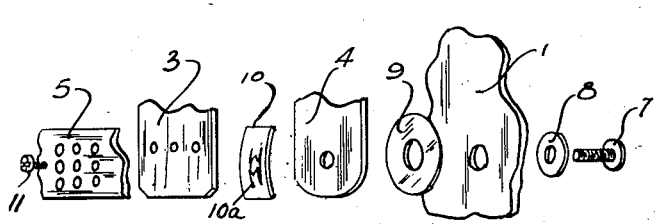
Figure 6 is an exploded view showing the various parts of Figure 2 in disassembled position.

An important feature of the invention resides in the relatively simple but highly efficient friction joint between the ears 4 and top portion of the helmet 1 shown more clearly in Figures 2 and 6. A machine screw 7, having a kerfed head on the outside of the helmet and a threaded stud portion 7a extending through a hole formed in the helmet, serves as the pivotal element for allowing pivotal movement of the helmet 1 with respect to the headband suspension. It is desirable to provide a washer 8, preferably a stainless steel washer, on the outside, and a larger washer 9 of the same material on the inside surface of helmet 1 to form a pivotal joint. A spring type speed nut 10 is provided, which nut is in the form of a piece of bowed sheet material having ears 10a struck upwardly thereof terminating in notched out triangular parts which closely embrace and ride on the threads of the threaded stud 7a. It will be apparent that upon rotating the head of machine screw 7 by a screw driver the bowed portion and ears of the speed nut 10 are flexed toward the ear 4 of the suspension to increase the friction at the pivotal joint which would require greater force for pivotal movement of the face shield and which would more firmly hold the shield in any adjusted position. Of course, if desired, an enlarged head with a serrated or polygonal margin may be used on screw 7 instead to allow turning by the hand instead of by a screw driver. I have found that the speed nut 10 has not only the known qualities of a nut for making a tight joint but has unexpected and heretofore unknown qualities of permitting variable friction adjustment over a wide range to allow selective and vernier pivotal adjustment of the relatively rotatable parts connected together, such as ear 4 and helmet 1.

It will be understood that a similar frictional joint to that shown in Figure 2 is located on the opposite side of the headband suspension 2. After screw 7 is turned and speed nut 10 sufficiently tensioned, the shield 1 may be tilted forwardly and lifted horizontally above the face and held in such position by friction.

Figure 3:
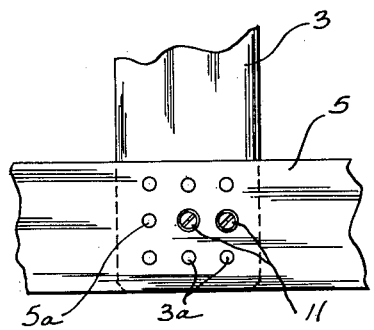
Figure 3 is an enlarged fragmentary view taken along line III—III of Figure 2 showing the adjusting means for the brow and crown straps.

Figure 3 shows an adjustable means for interconnecting and allowing raising or lowering of the brow strap 5 with respect to the crown strap 3. Nine holes 3a are provided in the brow strap 5 in the arrangement shown and three horizontally disposed holes 5a are provided in the crown strap 3. A pair of bolts 11 are extended through any two of the three holes of the crown strap 5 and any adjacent two of the nine holes of the brow strap 5 depending upon the adjustment desired. Of course, by selecting the uppermost holes on the brow strap 5 such strap is lowered. And upon selecting the forward two holes of the brow strap, that is, adjacent the front of the shield, the front half or rim portion of the brow strap is shortened such as in the case of a wearer having a small head size. At thte rear of the brow strap any well-known adjusting means (not shown) may be used to vary the overall perimeter of the brow band. Of course, instead of nine holes any other number, larger or smaller, may be used instead. Also instead of three holes, a smaller or greater number may be used to give a different range of adjustment. Also, instead of bolts and nuts 11, speed nuts or perhaps machine screws alone may be used. Moreover, instead of pivotally securing the helmet to ears 4, it may be secured directly to the brow band 5 (ears 4 being omitted in this instance).

Figure 4:
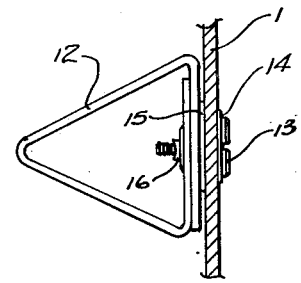
Figure 4 is an enlarged cross sectional view taken along line IV—IV of Figure 1 and showing the chin rest or stop.

Figure 4 shows a simple design of chin rest or stop, comprising a strip 12 of plastic material having elongated slots in the end portions thereof, which end portions are in overlapping relationship. A machine screw 13 is screwed through the front portion of the shield 1, outside washer 14, inside washer 15, and speed nut 16. Thus by unscrewing the screw 13, strap 12 may be lifted or lowered by virtue of the elongated slots in the end portions thereof so as to fit against the chin of any wearer.

Figure 5:
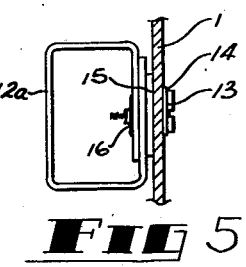
Figure 5 is a view similar to Figure 4 but showing a modified form of chin rest or stop taken along line V—V of Figure 1.

Figure 5 shows a modified form of chin rest or stop, very similar to that shown in Figure 4 except that the chin rest 12a is somewhat rectangular in form and extends crosswise of the front portion of the helmet instead of vertically as in Figure 4. Thus the chin rest is made of very simple parts and requires only one hole in the helmet for mounting.

Thus it will be seen that I have provided an efficient, adjustable suspension which is suitable for helmets and a wide variety of face shields of different types, to enable pivotal movement of the helmet or shield with respect to a headband suspension and thus permit lifting movements for uncovering the face of the wearer and for holding the shield in lifted position without manual support; furthermore, I have provided a very inexpensive friction joint involving a minimum number of simple and inexpensive parts to allow a wide range of adjustability of the amount of friction; furthermore I have provided a simple adjustment for raising or lowering of the brow band or for reducing the forward perimeter thereof to fit the heads of different wearers; also I have provided an adjustable and simple chin rest or stop which is easily mounted and adjusted and which is likewise economical to manufacture.

While I have illustrated and described several specific embodiments of my invention, it will be understood that these are by way of illustration only, and that various changes and modifications may be made within the contemplation of my invention and within the scope of the following claim.

I claim:

In combination with a face protecting shield, a headband suspension comprising a crown strap having adjustably secured thereto a brow band, a pair of ears secured to intermediate positions of said crown strap and having ends projecting outwardly in spaced relationship to said crown strap, means for pivotally and frictionally connecting the end portion of said ears to said shield comprising a bolt and a spring type speed nut for said bolt, said nut being in the form of a bowed strip of sheet steel having outwardly struck ear portions having ends engaging the threaded portion of said bolt so that upon tightening of the bolt said ear portions as well as said bow will be flexed inwardly toward said shield to progressively increase the frictional fit between said ears and shield to provide a wide range of adjustment.

References Cited in the file of this patent

UNITED STATES PATENTS

| | | |
|---|---|---|
| 1,885,426 | Flood | Nov. 1, 1932 |
| 2,169,745 | Shipman | Aug. 15, 1939 |
| 2,238,994 | Dockson et al. | Apr. 22, 1941 |
| 2,320,244 | Maillart | May 25, 1943 |
| 2,382,936 | Bedford | Aug. 14, 1945 |

FOREIGN PATENTS

| | | |
|---|---|---|
| 494,107 | Belgium | June 16, 1950 |